US 7,400,292 B2

(12) United States Patent
DiLellio

(10) Patent No.: US 7,400,292 B2
(45) Date of Patent: Jul. 15, 2008

(54) GPS NAVIGATION SYSTEM WITH INTEGRITY AND RELIABILITY MONITORING CHANNELS

(75) Inventor: James A. DiLellio, Irvine, CA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 10/605,890

(22) Filed: Nov. 4, 2003

(65) Prior Publication Data

US 2005/0093739 A1 May 5, 2005

(51) Int. Cl.
*G01S 5/14* (2006.01)
(52) U.S. Cl. .................................. 342/357.02
(58) Field of Classification Search ............ 342/357.02, 342/357.06, 357.03
See application file for complete search history.

(56) References Cited

U.S. PATENT DOCUMENTS

| 6,667,713 | B2 * | 12/2003 | Green et al. ........... 342/357.02 |
| 6,782,330 | B1 * | 8/2004 | Clark ........................ 702/66 |
| 6,850,187 | B1 * | 2/2005 | Clark .................... 342/357.06 |
| 2004/0248559 | A1 * | 12/2004 | Trautenberg ............. 455/412.1 |

OTHER PUBLICATIONS

Vioarsson, Logi et al , "Satellite Autoomous Integrity Monitoring And its Role in Enhancing GPS User Performance," ION meeting 2001, Sep. 12, 2002,pp. 1-13.*

Wolf, Robert, "Onboard Autonoous Integrity Monitoring using Intersatellite Links," ION GPS 2000, Sep. 19-20, 2000, Salt Lake City, Ut, pp. 1572-1581.*
Galilei, "The Galilei Project: GALILEO Design Consolidation," Aug. 2003 (http://europa.eu.int/comm/dgs/energy_transport/galileo).*
Muscemi, M., "GALILEO: Overview of the programme and mission," 1st Euro-Mediterranean GNSS Seminar, Feb. 2003.*
Benedicto, J. et al, "GALILEO: Satellite System Design and Technology Developments," European Space Agency, Nov. 2000.*
Hein, Gunter et al, "Status of GALILEO Frequency and Signal Design," Proc. of the Institute of Navigation, 2002.*
Stein, Barry et al, "GLobal Positioning System Integrity Channel: A System Design Analysis," 9th Proc of IEEE/AIAA/NASA, Digital Avionics Systems Conference, Oct. 1990.*
Hollreiser et al "GALILEO User Segment Overview," Proceedings of the ION GPS?GNSS Sep. 9-12, 2003 pp. 1914-1928.*
Kinal et al, "INMARSAT Integrity Channels for Global Navigation Satellite Systems," IEEE AES Magazine, Aug. 1992, pp. 22-25.*
Caporicci, et al, "GPS Integrity Monitoring and System Improvement with Ground Station and Multistationary Satellite Support," IEEE Plans 1992, Mar. 1992, pp. 559-565.*

(Continued)

*Primary Examiner*—Gregory C Issing
(74) *Attorney, Agent, or Firm*—Ostrager Chong Flaherty & Broitman P.C.

(57) ABSTRACT

A navigation system (10) includes one or more non-geostationary satellites (26) that generate signals having integrity information. A navigation receiver (16) determines range and position of the satellite (26,28) in response to the signals. The navigation system (10) may also determine accuracy and reliability of the range and position in response to the signals.

8 Claims, 2 Drawing Sheets

OTHER PUBLICATIONS

O'Keefe, K. et al, "Global Availability and Reliability Assessment of the GPS and Galileo Global Navigation Satellite Systems," Canadian Aeornautics and Space Journal, vol. 48, No. 2, Jun. 2002, pp. 123-132.☐☐.*

Hegarty et al, "Simulation of a Civil Integrity Network," IEEE Plan 1992, Mar. 1992, pp. 457-463.*

Martin Hollreiser, et al., "Galileo User Segment Overview", Proceedings of ION GPS/GNSS 2003, Sep. 9-12, 1963, pp. 1914-1928, Portland, OR, USA.

Carlos H. Medel, et al., "SISA Computation Algorithms and Their Applicability for Galileo Integrity", Proceedings of ION GPS 2002, Sep. 24-27, 2002, pp. 2173-2184, Portand, OR, USA.

Riccardo Dellago, et al., "The Galileo System Architecture at the End of the Design Phase", Proceedings of ION GPS 2003, Sep. 9-12, 2003, pp. 978-990, Portland, OR, USA.

Manfred Lugert, et al., "Galileo Ground Segment for Navigation and Integrity", Proceedings of ION GPS 2002, Sep. 24-27, 2002, pp. 2135-2147, Portland OR, USA.

Raymond DiEsposti, et al., "GPS III URA and URRA Information for Optimal User Performance", Proceedings of ION GPS 2003, Sep. 12, 1963, pp. 504-512, Portland OR, USA.

Bradforl W. Parkinson, "GPS Error Analysis", Chapter 1, 1994, American Institute of Aeronautics and Astronautics, Inc., USA.

* cited by examiner

GPS NAVIGATION SYSTEM WITH INTEGRITY AND RELIABILITY MONITORING CHANNELS

GOVERNMENT LEGEND

This invention was made with Government Support under F04701-01-C-0010 awarded by the U.S. Air Force. The Government has certain rights in this invention.

BACKGROUND OF INVENTION

The present invention relates generally to navigation systems. More particularly, the present invention is related to a system and method of operating a global positioning system and related architecture.

The current global positioning system (GPS) provides timing and navigation for a wide range of applications, such as intelligent transportation systems, telecommunications, delivery of military munitions, and power control grids. The applications may be military or civilian related. Civilian applications include commercial and noncommercial applications.

The GPS is designed to provide three-dimensional navigation anywhere in the world, at any time, and under all weather conditions. The GPS generates a pair of timing signals that are broadcasted on two frequencies of the L-band. The two frequencies are designated as L1 and L2. Time, range, and position information of each satellite can be obtained from the timing signal. A GPS receiver can use time of arrival information to determine range information. The receiver, by receiving multiple timing signals from multiple satellites, can also determine position information. Each satellite transmits a unique code, which enables the satellites within the GPS system to use the same L1 and L2 frequencies. The timing signal on the L1 frequency is broadcasted having a short unencrypted code that is used for both military and civilian applications. The coded timing signal on the L2 frequency is broadcasted having a longer encrypted code that is only used for authorized users of the United States military and its allies.

The use of the two frequencies allows the military GPS receivers to account for some atmospheric effects on the ranging signals. Thus, the military operated GPS receivers are typically more accurate than the civilian receivers. The military receivers are accurate to approximately within ten meters (see the Precise Positioning Service Performance Standard for military specification standards) as opposed to the civilian receivers, which are accurate to approximately within tens of meters (see the Standard Positioning Service Performance Standard for civilian specification standards).

The current GPS is not designed for civilian aviation applications that require integrity or guaranteed position accuracy, and is therefore limited for aviation use. Civilian aviation requirements, which are meant to assure accuracy of the GPS received signals and prevent collisions or injuries to vehicles and occupants therein, are more stringent than existing GPS operating requirements for such applications. Civilian requirements include an assured accuracy requirement that is on the order of approximately ten meters in the vertical direction. Civilian requirements also include a "time to alert" requirement that refers to a maximum allowable amount of time to notify a pilot when a navigation system malfunction or inaccuracy exists within the GPS signals. When a malfunction that is undesirable exists within the GPS, the GPS navigation solution or resulting data is no longer safe for use.

There currently exists several regional satellite health monitoring systems including the European Geostationary Navigation Overlay Service (EGNOS), the MTSAT Satellite Augmentation System (MSAS), and the Wide Area Augmentation System (WAAS). These systems monitor integrity of the GPS signals and determine errors associated with positions and clocks of satellites, and atmospheric attenuation. The error information along with other integrity information is transmitted to the geostationary satellites, which is then retransmitted such that an aircraft may determine a current GPS status and errors associated with the received GPS signals. These monitoring systems enable trusted, but limited vertical navigation over selected service volumes, such as the continental United States for the WAAS, western Europe for the EGNOS, and mainland Japan for the MSAS.

The current GPS requirement for response time for a stand-alone GPS without additional regional monitoring is approximately six hours. Actual response time varies from approximately one half an hour to four hours. This is unacceptable for civilian applications that require received and used navigation values to be reliable. Such a long time delay to warn can result in a collision and injury to an aircraft and occupants therein.

Although the GPS-enabled avionics is relatively inexpensive to deploy, accuracy and time to alert deficiencies of the GPS prevent it from being relied upon during the landing phase of civilian flight. Currently, in low visibility conditions, a civilian aircraft is capable of landing through use of an instrument landing system (ILS). The pilot of the aircraft monitors an instrument that senses a radar signal from the ground and in response thereto performs a landing. However, the ILS is expensive and is only available at a limited number of airports, which are typically large commercial airports, such as international airports. It is unsafe to land an aircraft in a low visibility area without use of an ILS system and is generally not permitted by regional civil aviation authorities.

Thus, there exists a need for an improved navigation system that is accurate, provides integrity information quickly, is global, and is inexpensive such that it may be used and relied upon for civilian aviation applications.

SUMMARY OF INVENTION

The present invention provides a trusted navigation system as part of a current GPS constellation. The navigation system may include the block IIF medium earth orbit (MEO) satellites, which are used to generate signals having integrity information. A navigation receiver determines range and position of the satellites in response to the signals. The navigation system may also determine accuracy and reliability of the range and position in response to the integrity information.

The embodiments of the present invention provide several advantages. One such advantage that is provided is the provision of a navigation system that provides trusted GPS navigation information that satisfies integrity specifications for civilian aviation applications.

Another advantage that is provided by multiple embodiments of the present invention is the provision of a navigation system that globally indicates reliability of GPS related information and satisfies time to alert requirements for civilian aviation applications.

Furthermore, the present invention provides a navigation system that may be implemented in cooperation with existing spacecraft including block II spacecraft, or future block III spacecraft.

Moreover, the present invention provides a tight integration of both civilian and military assets, thereby, satisfying and meeting stringent aviation performance requirements while minimizing civil aviation costs of a trusted and reliable navigation system.

In addition, the present invention provides a navigation system that may be used globally. In so doing, the present invention allows a GPS receiver to receive accurate GPS information anywhere in the world. The navigation system aids in the ability of an aircraft to land at an airport that is not equipped with an instrument landing system.

The present invention itself, together with further objects and attendant advantages, will be best understood by reference to the following detailed description, taken in conjunction with the accompanying drawing.

DETAILED DESCRIPTION

While the present invention is described with respect to a system and method of operating a global positioning system (GPS) and related architecture, the present invention may be adapted to be used in various applications known in the art. The present invention may be applied in military and civilian applications. The present invention may be applied to aerospace systems, telecommunication systems, intelligent transportation systems, power control grids, and other GPS applications known in the art. The present invention may also be utilized with respect to various GPS receivers and systems known in the art.

In the following description, various operating parameters and components are described for one constructed embodiment. These specific parameters and components are included as examples and are not meant to be limiting.

Also, the term "GPS related information" includes all information related to a GPS or global positioning navigation system. GPS related information may include timing information, range information, position information, integrity information, and reliability information, as well as other information known in the art. GPS related information may be transmitted and received to and from various spacecraft, aircraft, and ground stations, and other GPS devices known in the art.

Figure 1:
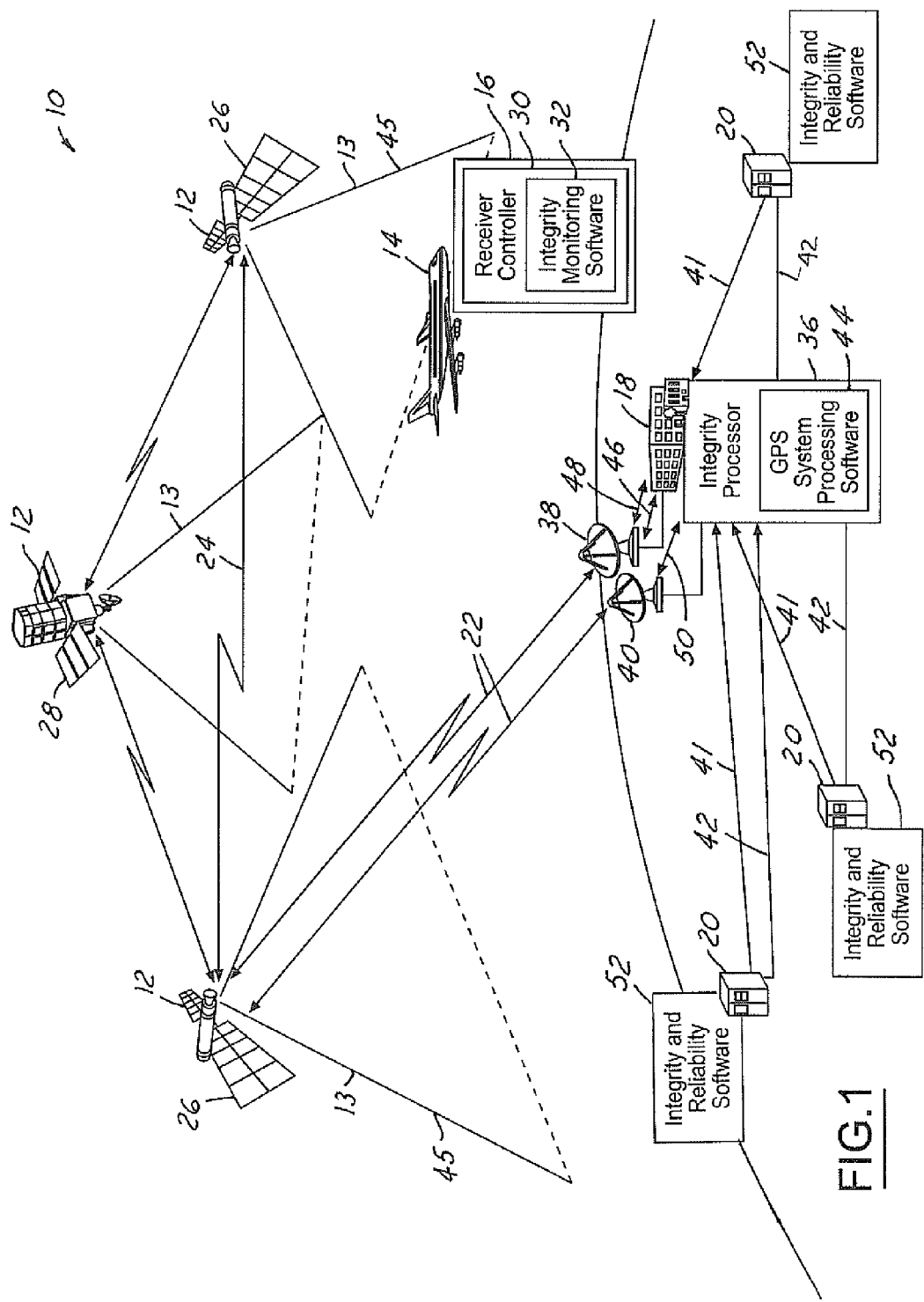
FIG. 1 is a perspective and block diagrammatic view of a global positioning navigation system in accordance with an embodiment of the present invention.

Referring now to FIG. 1, a perspective and block diagrammatic view of a global positioning navigation system 10 in accordance with an embodiment of the present invention is shown. The system 10 includes multiple satellites 12 that receive and transmit GPS related information. The satellites 12 transmit GPS signals that contain the GPS related information, regionally for reception by various GPS receivers, which is represented by areas 13. For example, the aircraft 14 includes a GPS receiver 16, which determines position of the aircraft 14 in response to the GPS signals 13. The receiver 16 may also determine accuracy and reliability of the GPS information received.

The satellites 12 also transmit and receive GPS related information to and from a central station 18. The central station 18 determines the accuracy and reliability of the GPS signals 13. The central station 18 determines the accuracy and reliability utilizing measured information gathered from multiple networks of monitoring station external interfaces 20, which monitor navigation performance of the satellites 12. The accuracy and reliability information is relayed to the satellites 12 and aid the receiver 16 in determining accuracy and reliability of the GPS signals 13.

The satellites 12 communicate with the ground stations, such as the central station 18, via uplink and downlink signals, which are represented by the double arrows 22. The uplink and downlink signals may be transmitted over S-band frequencies. Communication between the satellites 12 occurs through use of an omnidirectional or directional crosslink, which is represented by the double arrow 24. The satellites 12 transmit to the user receivers 16 over the frequencies in the L-band.

Although the present invention is described with respect to utilizing the S-band and the L-band frequencies, other frequency bands may be utilized. Also, with respect to the L-band, although several embodiments of the present invention utilize the L1, L2C, and L5 frequencies, various other frequencies within the L-band may be utilized. This will become more evident in review of the following specification.

The satellites 12 include medium earth orbit satellites. Satellites 26 and 28 are examples of medium earth orbit satellites. Any number of satellites may be included in the system 10. The satellites 12 may be of type IIF, IIRm, III, or of some other type known in the art. In one embodiment of the present invention, the medium earth orbit satellites 26 are of type IIF or III and are capable of transmitting GPS signals on the L1, L2C, and L5 frequencies, whereas the satellites 28 are of the type IIRm and are capable of transmitting GPS signals on the L1 and L2C frequencies.

The L1 frequency is typically used for transmission of the short unencrypted coarse acquisition (C/A) code. The L2C frequency is modulated on the L2 unprotected frequency.

GPS related information, transmitted on the L2C frequency, is coded using a civilian designated code. The L2C frequency offers improved signal robustness and improved performance in low power environments over use of only the L1 frequency and C/A code. The L2C frequency can be used to accelerate the capability of the system 10, by reducing the atmospheric error in measurements made by the civilian GPS user. The L5 frequency is a newly designated civilian frequency having multiple message types. The L1, L2C, and L5 frequencies and utilization thereof are further described in detail below.

The receiver 16 includes a receiver controller 30, which determines range, position, accuracy, and reliability information, as well as other information known in the art. The receiver 16 may be of various types and styles. The receiver 16 may be in the form of an aircraft receiver, as shown, may be in the form of a telecommunications receiver, a ground based vehicle receiver, a hand-held receiver, or may be in some other form known in the art.

The controller 30 may be microprocessor based such as a computer having a central processing unit, memory (RAM and/or ROM), and associated input and output buses. The controller 30 may be an application-specific integrated circuit or may be formed of other logic devices known in the art. The controller 30 may be a portion of a central control unit of the aircraft 14 or may be a stand-alone controller, as shown.

The controller 30 includes the integrity-monitoring software 32, which is used to determine integrity of the GPS signals 13 and allows the receiver 16 to operate as an integrity-monitoring device. The controller 30 uses the integrity monitoring software 32 for fault detection and may use the software 32 for exclusion. The controller 30 monitors the GPS signals 13, which may be received from several of the satellites 12 that are within view of the receiver 16. There are typically more satellites in view than the number needed for navigation. A set of 4 satellites is usually required to perform a navigation position calculation. The controller 30 performs an internal consistency check from a set of redundant measurements received from the satellites 12. In response to the internal consistency check the controller 30 detects and may remove a faulty satellite from the set used for navigation. This is described in further detail below with respect to the method of FIG. 2.

Unlike traditional integrity monitoring software, the monitoring software 32 incorporates integrity information received from the satellites 12 in addition to an internal self-consistency check for fault detection and exclusion. In one embodiment of the present invention, the receiver 16 receives integrity information over the L5 integrity channel from the satellites 26. The integrity information originates from the central station 18 based on the measurements from the monitoring interfaces 20. The software 32, by utilizing the received integrity information, is position accurate to within at least approximately ten meters as opposed to traditional user integrity monitoring software, which is accurate to within approximately a couple hundred meters.

The central station 18 includes an integrity processor 36, a first ground antenna 38, and a second ground antenna 40. The integrity processor 36 receives GPS measured signals 41 over data links 42 from the monitoring interfaces 20. The measured signals 41 include pseudorange measurements and navigation data from the GPS signals 13. The measured signals 41 may also include suggested correction adjustments to adjust or compensate for inaccuracies in the GPS signals 13. The central station 18 may receive the measured signals 41 via wired or wireless communication as stated further below, but in near real-time.

The central station 18 performs calculations using the information contained within the measured signals 41 and generates integrity signals 46, which are transmitted over the S-band to the on-board memory of the satellites 26. The integrity signals 46 are in the form of a user range accuracy (URA) messages. The integrity processor 36 has GPS system processing software 44 for the URA processing and synchronization with the measured signals 41. The integrity signals 46 are essentially a bound on clock and ephemeris error within the GPS signals 13. The integrity signals 46 are transmitted to a receiver, such as the receiver 16, by the MEO satellites 26, as represented by areas 45. The central station 18 may receive the integrity signals 46 over the L5 frequency.

The central station 18 may determine signal integrity and in response thereto may signal the satellites 12 of a fault or error via an uploaded command. When a satellite or component therein is operating inappropriately such that a fault or error exists, an operator generates the command signal. The command signal may be a SATZAP™ command signal that informs the satellite 12 as to such status information and allows the satellite 12 to adjust subsequently generated GPS signals accordingly. An example of a fault is when a satellite clock is operating inappropriately such that it no longer generates a correct time signal.

The central station 18 also generates navigation signals or messages 48 and reliability signals 50. The navigation messages 48 include satellite position and clock information as well as other information known in the art. The navigation messages 48 may also include a URA message that may be transmitted on the L1 and L5 civilian frequencies. The URA message includes the contribution to the range-measurement error from an individual error source, as is known in the art. A satellite having a high URA can be interpreted as having selective availability turned on.

The reliability signals 50 inform the satellites 26 that constellation performance is being monitored and the status or health of each satellite 12. The health of each satellite 12 refers to whether a satellite is operating appropriately, whether signals generated from that satellite contain errors, the extent of the errors, and whether the errors are within desired bounds. The reliability signals 50 may be modulated on the S-band frequency.

The first ground antenna 38 is utilized for transmission of the integrity signals 46 and the navigation messages 48. The second ground antenna 40 is utilized for the transmission of the reliability signals 50. The first ground antenna 38 and the second ground antenna 40 may be of various sizes, shapes, and styles. In one embodiment, the first ground antenna 38 is in the form of a dish having a 30" diameter and the second ground antenna 40 is in the form of a dish having a 10" diameter.

The monitoring interfaces 20 monitor the GPS signals 13 and provide integrity information to the central station 18. The monitoring interfaces 20 include integrity and reliability software 52 that determines whether the satellites 12 are operating inappropriately or generating GPS signals that contain errors. The monitoring interfaces 20 provide an alert when the GPS signals are broadcasted with out of tolerance GPS errors. The alert may be included in the measured signals 41. The monitoring interfaces 20 may also provide corrections to improve accuracy of the GPS signals 13, as well as other information known in the art.

The monitoring interfaces 20 transmit the measured signals to the central station 18 via the associated data links 42 continually, in near real time. The data links 42 may be in the form of copper or fiber optic cabling. The data links 42 may, for example be over a Ti connection or the like. The monitoring interfaces 20 may provide the information using integrated satellite connections, such as those by SATCOM™. Of course, the monitoring interfaces 20 may communicate with the central station 18 using other known methods of communication. The monitoring interfaces 20 may communicate with the central station 18 via wireless communication and have associated antennas for such communication. The monitoring interfaces 20 may include, for example, the Wide Area Augmentation System (WAAS), the Multi-function Transportation Satellite Augmentation System (MSAS), and the European Geostationary Navigation Overlay System (EGNOS), as well as other augmentation and monitoring systems known in the art.

The monitoring interfaces 20 may monitor the GPS signals 13 over various frequencies including the L-band frequencies. Since the monitoring interfaces 20 are on the ground and are in a stable and controlled environment they are able to accurately track these frequencies and provide a precise assessment for improvement thereon.

Figure 2:
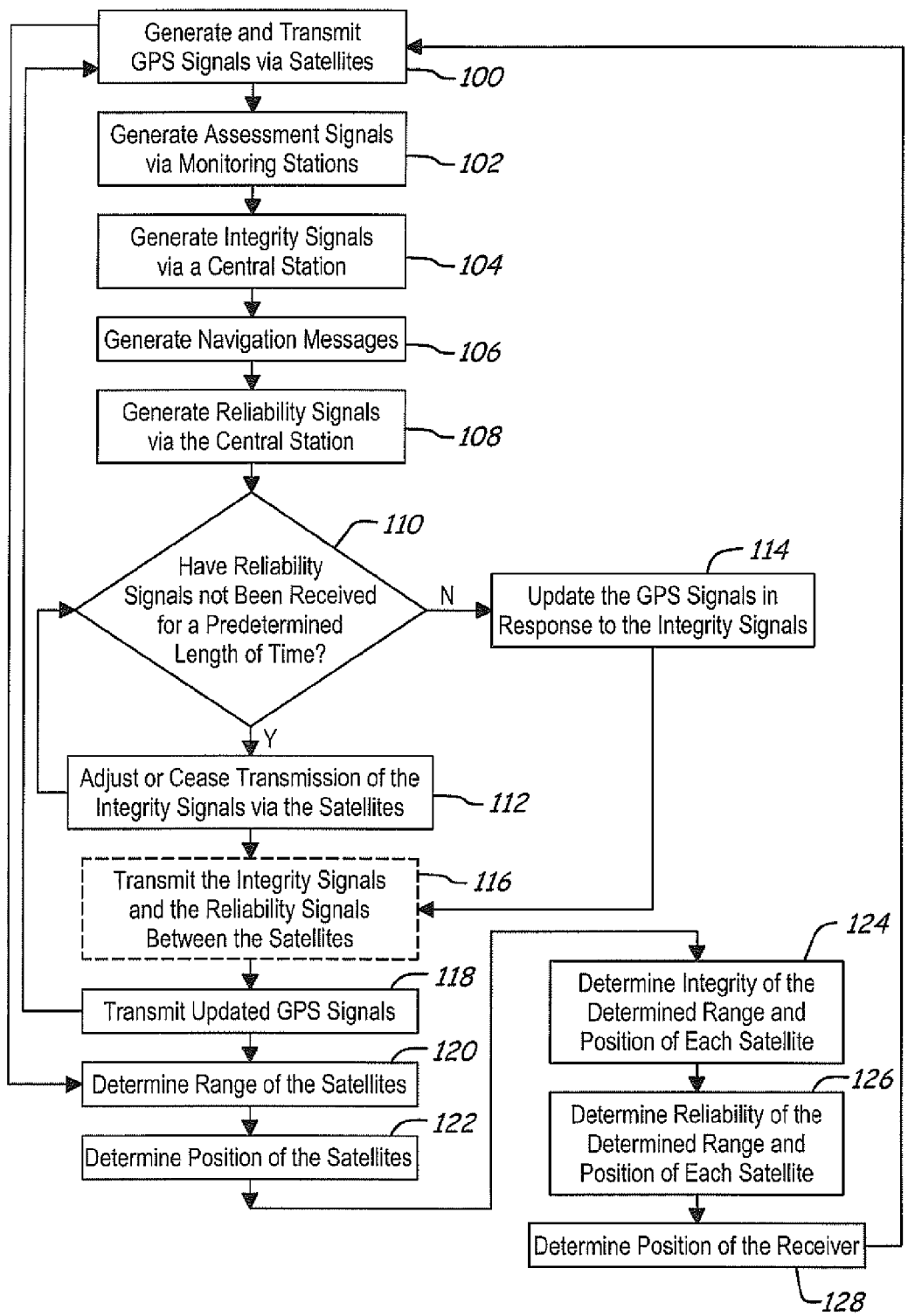
FIG. 2 is a logic flow diagram illustrating a method of operating the global positioning navigation system in accordance with multiple embodiments of the present invention.

Referring now also to FIG. 2, a logic flow diagram illustrating a method of operating the navigation system 10 in accordance with multiple embodiments of the present invention is shown.

In step 100, the satellites 12 generate and transmit the GPS signals 13. The GPS signals include timing signals and data signals, for determining range and position of each satellite that is within view. In one embodiment of the present invention, the timing signals and data signals are transmitted on the L1, L2C, and L5 frequencies.

The GPS signals 13 may also include the integrity signals 46 for determining the accuracy of the ranges and positions of the satellites 12. The integrity signals 46 are actually generated by the central station 18, in step 106, and retransmitted by the satellites 12.

Each satellite 26 receives different URA bits associated with that particular satellite, as well as others within its general proximity. The URA messages are received by the receiver 16 in the form of a constellation on a particular frequency, such as the L5 frequency. The integrity signals 46 may be transmitted in the form of a predetermined L5 message type and modulated on the L5 frequency such that they have a designated integrity channel. Each satellite 26 may modify each integrity signal 46, according to the received URA bits.

In step 102, the monitoring interfaces 20 measures the GPS signals 13. The monitoring interfaces 20 in response to the GPS signals 13 generate the measured signals 41. The measured signals 41 may be transmitted continuously to the central station 18.

In step 104, the central station 18 generates the integrity signals 46 in response to the measured signals 41. The integrity signals 46 may be broadcast over the L5 frequency on a predetermined message type, as stated above. In an embodiment of the present invention, the integrity signals 46 are broadcast periodically at predetermined time intervals.

In step 106, the central station 18 generates and transmits the navigation messages 48 to each satellite 12. The navigation messages 48 originate from the central station 18.

In step 108, the central station 18 also generates the reliability signals 50 that inform the satellites 12 that they are being monitored and the status or health of each satellite. The processor 36 confirms that the integrity signals 46 are within an appropriate bound of the system error before generation of the reliability signals 50. The reliability signals 50 may be in the form of URA monitoring bits. In one embodiment, the URA monitoring bits are received by the satellites 12 and are not forwarded to the aircraft 14, but instead are evaluated by the spacecraft 26.

In step 110, the satellites 26 monitor the time to receive the reliability signals 50. When the reliability signals 50 have not been received for a predetermined length of time the satellites 26 proceed to step 112, otherwise step 114 is performed.

In step 112, when the satellites 26 do not receive the reliability signals 50 for a predetermined length of time the satellites 26 "time out" and determine that a fault exists within the system 10. The satellites 26, in response to the "time out", may adjust the integrity signals 46 when the integrity signals 46 to reflect or indicate that an error exists or may cease transmission of the integrity signals 46. When the integrity signals 46 are no longer transmitted the satellites 26 proceed to step 110.

In step 114, the satellites 12 receive the reliability signals 50 and in response thereto perform appropriate corrections to continue the broadcasting of the integrity signals 46.

In step 116, the integrity signals 46 and the reliability signals 50 may be transmitted between the satellites 26 via the crosslink 24. The navigation message update (NMU) (not shown) may be upgraded for the message type of the integrity signals 46. The NMU may be upgraded to include, for example, the L5 message type.

In step 118, the satellites 12 after updating the GPS related information, similar to step 100, may transmit the updated GPS signals 13. The satellites 12 upon performing step 118 return to step 100.

The following steps 120-128 may be performed simultaneously with steps 100-118. In step 120, the receiver 16 determines the range of the satellites 12 relative to the aircraft 14 and in response to the timing information contained within the GPS signals 13.

In step 122, the receiver 16 determines the position of the satellites 12 in response to the data contained within the GPS signals 13. The position information may include earth centered, earth fixed coordinate data for determining three-dimensional positions. The receiver 16 may measure the time delay for the timing signals to travel from the satellites 12 to the receiver 16 and multiply by the speed of light to determine pseudoranges of the satellites 12. The pseudoranges are ranges of the satellites 12 plus a receiver clock offset and other propagation errors.

The receiver 16, in order to acquire more accurate range information utilizes the GPS related information transmitted on a pair of frequencies to account for affects of the ionosphere. The receiver 16, using techniques known in the art, converts the range information received on the frequencies to improve accuracy for the range to the receiver 16. For example, the receiver 16 when determining range of each satellite 12 may acquire the data signals on both the L1 and L5 frequencies or on both the L2C and the L5 frequencies.

In step 124, the receiver 16 determines the integrity of the determined range and position of each satellite 12 in response to the integrity signals 46. The controller 30 utilizes the integrity software 32 to perform a self-consistency check. In performing the self-consistency check the controller 30 monitors the GPS signals 13 that are within range and utilizes the information contained within the integrity signals 46. In so doing, the controller 30 determines the integrity of the ranging information. When one or more of the satellites 12 "times out", such as in step 112, the controller 30 may provide range and position information, but may no longer provide integrity information. Satellites that "time out" are then excluded from the position calculations of the receiver 16 for critical phases of flight, such as precision approach and landing operations.

In step 126, the receiver 16 determines reliability of the position information in response to the integrity signals 46. The integrity software 32 is used when monitoring the integrity signals 46 to determine reliability thereof. The reliability of the integrity signals 46 may be indicated in the form of a reliability value or level or in some other fashion, as known in the art. When an error is indicated on the integrity signals 46 or position accuracy information is not available, the reliability of the position signals is low. When the integrity signals 46 signify an accuracy measurement that is within desired bounds, the reliability is high. The integrity software 32 in determining reliability, checks to assure that no hard fault exists within one of the satellites 12, such as a satellite clock not functioning or functioning improperly and generating or indicating an inaccurate time.

In step 128, the receiver 16 determines the position of the receiver 16 or, in this example embodiment, determines the position of the aircraft 14 upon determining the position and the range of each satellite 12. The receiver 16 may determine the position of the aircraft 14 from the position and pseudorange of each satellite 12. The position of the aircraft 14 may be utilized and relied upon to perform various flight tasks depending upon the reliability level, as determined in step 126.

The above-described steps are meant to be an illustrative example; the steps may be performed sequentially, simultaneously, synchronously or in a different order depending upon the application.

The present invention provides a global positioning navigation system that allows for an aircraft to land at any airport without being regionally limited and without use of an instrument landing system. The present invention allows for increased flight to and utilization of airports that are not equipped with an instrument landing system. The present invention also reduces the costs for the instrumentation and equipment needed in order to perform a precision landing. The present invention satisfies civilian requirements for accuracy with integrity and time to alert of within approximately ten meters and six seconds, respectively. In addition, the present invention provides an efficient and tighter integration of the United State Air Force and Federal Aviation Administration resources in the implementation of a GPS civil aviation landing system.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A method of operating a navigation system comprising the following steps:
   (a) transmitting GPS signals from a plurality of satellites;
   (b) monitoring the GPS signals transmitted by said satellites using a network of monitoring stations, said monitoring stations transmitting measurement information acquired during said monitoring step to a central station;
   (c) determining at said central station the integrity and reliability of the GPS signals transmitted by said satellites as a function of said measurement information received from said monitoring stations;
   (d) transmitting signals representing the integrity and reliability of the GPS signals transmitted by said satellites from said central station to said satellites, said integrity signals being in the form of user range accuracy messages, and said reliability signals being in the form of user range accuracy monitoring bits representing the health of each of said satellites;
   (e) transmitting updated GPS signals and not transmitting said reliability signals from said satellites, said updated GPS signals taking into account said integrity signals and said reliability signals, said transmitted updated GPS signals including integrity signals in the form of user range accuracy messages;
   (f) determining at a navigation receiver the range and position of each of said satellites based on said updated GPS signals received from said satellites by said navigation receiver;
   (g) determining at said navigation receiver the integrity of the determined position of each satellite as a function of the integrity signals included in said updated GPS signals;
   (h) determining at said navigation receiver the position of said navigation receiver based on the determined ranges and positions of said satellites; and
   (i) performing a task utilizing said determined position of said navigation receiver only if said reliability value is above a certain threshold.

2. The method as recited in claim 1, wherein step (g) comprises performing a self-consistency check.

3. The method as recited in claim 1, wherein if one of said satellites does not receive reliability signals from said central station for a predetermined length of time, said one satellite sends updated GPS signals containing integrity signals indicating an error or updated GPS signals not containing integrity signals, and said navigation receiver does not rely on updated GPS signals from said one satellite.

4. The method as recited in claim 1, wherein said navigation receiver is aboard an airplane.

5. A navigation system comprising a plurality of monitoring stations, a central station, a plurality of satellites, and a navigation receiver comprising a controller for determining the position of said navigation receiver and the reliability of said determined receiver position, wherein each of said satellites transmits GPS signals, said monitoring stations monitor the GPS signals transmitted by said satellites and transmit measurement information acquired during said monitoring to said central station, said central station determines the integrity and reliability of the GPS signals transmitted by said satellites as a function of said measurement information received from said monitoring stations and then transmits signals representing the integrity and reliability of the GPS signals transmitted by said satellites from said central station to said satellites, said integrity signals being in the form of user range accuracy messages, and said reliability signals being in the form of user range accuracy monitoring bits representing the health of each of said satellites, and wherein said satellites transmit updated GPS signals and do not transmit said reliability signals, said updated GPS signals taking into account said integrity signals and said reliability signals, said transmitted updated GPS signals including integrity signals in the form of user range accuracy messages, and said navigation receiver determines the range and position of each of said satellites based on said updated GPS signals received from said satellites, determines the integrity of the determined position of each satellite as a function of the integrity signals included in said updated GPS signals, and determines the position of said navigation receiver based on the determined ranges and positions of said satellites.

6. The system as recited in claim 5, wherein said navigation receiver is aboard an airplane.

7. The system as recited in claim 5, wherein said navigation receiver determines the integrity of the determined position of each satellite by performing a self-consistency check.

8. The system as recited in claim 5, wherein if one of said satellites does not receive reliability signals from said central station for a predetermined length of time, said one satellite sends updated GPS signals containing integrity signals indicating an error or updated GPS signals not containing integrity signals, and said navigation receiver does not rely on updated OPS signals from said one satellite.

* * * * *